(12) United States Patent
Kiladis et al.

(10) Patent No.: US 11,270,337 B2
(45) Date of Patent: Mar. 8, 2022

(54) MACHINE LEARNING-BASED MEDIA CONTENT SEQUENCING AND PLACEMENT

(71) Applicant: ViralGains Inc., Boston, MA (US)

(72) Inventors: Glenn J. Kiladis, Andover, MA (US); Aron Robert Schatz, Bridgewater, NJ (US)

( * ) Notice: Subject to any disclaimer, the term of this patent is extended or adjusted under 35 U.S.C. 154(b) by 0 days.

(21) Appl. No.: 16/022,161

(22) Filed: Jun. 28, 2018

(65) Prior Publication Data
US 2019/0139086 A1    May 9, 2019

Related U.S. Application Data (60) Provisional application No. 62/691,337, filed on Jun. 28, 2018, provisional application No. 62/612,604, filed on Dec. 31, 2017, provisional application No. 62/583,439, filed on Nov. 8, 2017.

(51) Int. Cl.
| | |
|---|---|
| *G06N 20/00* | (2019.01) |
| *G06Q 30/02* | (2012.01) |
| *G06N 3/08* | (2006.01) |
| *G06N 7/00* | (2006.01) |

(Continued)

(52) U.S. Cl.
CPC ....... *G06Q 30/0251* (2013.01); *G06F 16/735* (2019.01); *G06N 3/08* (2013.01); *G06N 7/005* (2013.01); *G06N 20/00* (2019.01); *H04L 67/22* (2013.01)

(58) Field of Classification Search
CPC ............ G06Q 30/0277; G06Q 30/0251; G06F 15/18; G06F 17/30828; G06N 3/08; G06N 7/005; H04L 67/22
See application file for complete search history.

(56) References Cited

U.S. PATENT DOCUMENTS

| | | | |
|---|---|---|---|
| 6,714,975 B1 | 3/2004 | Aggarwal et al. | |
| 2006/0020510 A1* | 1/2006 | Vest | G06Q 30/02 705/14.52 |
| 2008/0120646 A1 | 5/2008 | Stern et al. | |

(Continued)

OTHER PUBLICATIONS

"International Search Report and Written Opinion Received for PCT Application No. PCT/US18/59513 dated Feb. 20, 2019".

*Primary Examiner* — Kamran Afshar
*Assistant Examiner* — Ying Yu Chen
(74) *Attorney, Agent, or Firm* — Patent GC LLC; Alexander Franco (57) ABSTRACT

A system performs an automated analysis on a set of related media content items, such as static and video display advertisements for a coordinated advertising campaign. The analysis can include, for example, recognition of products, services, brands, objects, music, speech, motion, colors and moods, in order to determine content profiles for the content items. Different sequences of the media content items are placed within the web browsing paths of individual users, and the responses to the sequences are monitored with respect to desired outcomes, such as the purchase of a product or the visiting of an advertiser's website. The content profiles, the sequences, the placements, and the responses are provided as input into a machine learning system that is trained to select sequences and placements of media content items that achieve the desired outcomes. The system can be trained in part or wholly using feedback from its own output.

21 Claims, 8 Drawing Sheets

(51) Int. Cl.
*H04L 67/50* (2022.01)
*G06F 16/735* (2019.01)

(56) References Cited

U.S. PATENT DOCUMENTS

| | | |
|---|---|---|
| 2010/0122286 A1 | 5/2010 | Begeja et al. |
| 2010/0191689 A1 | 7/2010 | Cortes et al. |
| 2014/0189539 A1* | 7/2014 | St. Clair ................. G06F 3/048 715/753 |
| 2014/0215506 A1* | 7/2014 | Kalmes ............ H04N 21/25841 725/14 |
| 2014/0215529 A1* | 7/2014 | Good ................ H04N 21/4725 725/60 |
| 2014/0365320 A1* | 12/2014 | Kanter ............... G06Q 30/0277 705/14.73 |
| 2015/0324827 A1 | 11/2015 | Upstone et al. |
| 2016/0050465 A1 | 2/2016 | Zaheer et al. |
| 2016/0196348 A1* | 7/2016 | Rodriguez ........ G06F 16/90324 707/727 |
| 2017/0323307 A1* | 11/2017 | Teinila .................. G06Q 30/02 |
| 2018/0005483 A1* | 1/2018 | Washington ........ G07F 17/3213 |
| 2018/0060883 A1* | 3/2018 | Cheesman ......... G06Q 30/0201 |
| 2018/0308124 A1* | 10/2018 | Gao .................. G06Q 30/0251 |

* cited by examiner

MACHINE LEARNING-BASED MEDIA CONTENT SEQUENCING AND PLACEMENT

RELATED APPLICATIONS

The subject matter of this application is related to U.S. Provisional Application No. 62/583,439, filed on 2017 Nov. 8, U.S. Provisional Application No. 62/612,604, filed on 2017 Dec. 31, and U.S. Provisional Application No. 62/691,337, filed on 2018 Jun. 28, all of which applications are incorporated herein by reference in their entireties.

BACKGROUND OF THE INVENTION

Current trends in web and app targeted advertising placement focus primarily on placing individual advertisements. A sequence of related advertisement placements, however, placed within or on the pages of a single user's web browsing path or clickstream may be able to achieve an advertising objective that may not be able to be achieved through any one single advertisement. The sequence of placements, may, for example, appear at various times and at different or unrelated locations on the World Wide Web for any one user. Known techniques can be used to track a single user and target a sequence of advertisements to a user, for example, to convey to the user an evolving story about a product or a brand. What is needed, however, is a way to automate the sequencing and placement of creative content to individual users with a goal of improving effectiveness of the sequence while reducing or eliminating the need for manual sequencing and placement.

SUMMARY OF THE INVENTION

A system performs an automated analysis on a set of related media content items, such as static and video display advertisements for a coordinated advertising campaign. The analysis can include, for example, recognition of products, services, brands, objects, music, speech, motion, colors and moods, in order to determine content profiles for the content items. Different sequences of the media content items are placed within the web browsing paths of individual users, and the responses to the sequences are monitored with respect to desired outcomes, such as the purchase of a product or the visiting of an advertiser's website. The content profiles, the sequences, the placements, and the responses are provided as input into a machine learning system that is trained to select sequences and placements of media content items that achieve the desired outcomes. The system can be trained in part or wholly using feedback from its own output.

A method is performed by a computer system having at least one processor and a memory. The method can include: for each media content item of a plurality of related media content items, generating a content profile for the media content item by performing an automated analysis of the media content item, wherein the content profile comprises a plurality of attribute fields each of which attribute fields specifies a characteristic of the media content item determined based on the automated analysis; for each sequence of a plurality of different sequences of media content items selected from the plurality of related media content items, and with respect to the each sequence, for each user of a plurality of users: presenting an instance of the sequence by, for each media content item in the sequence, causing an instance of the each media content item to be presented to the each user, and for each instance in which a media content item in the sequence is presented to the each user, associating the each instance in which the media content item is presented with: the instance of the sequence, and an interaction profile indicative of user responses related to the presentation of the media content item; selecting a target media content item from the plurality of related media content items to present to a target user based on: a sequence of the plurality of related media content items previously presented to the target user, the content profiles for the plurality of related media content items, the interaction profiles for the instances in which media content items are presented, and the associations between instances of media content items being presented and instances of sequences in which media content items are presented; and causing the target media content item to be presented to the target user.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

Figure 1:
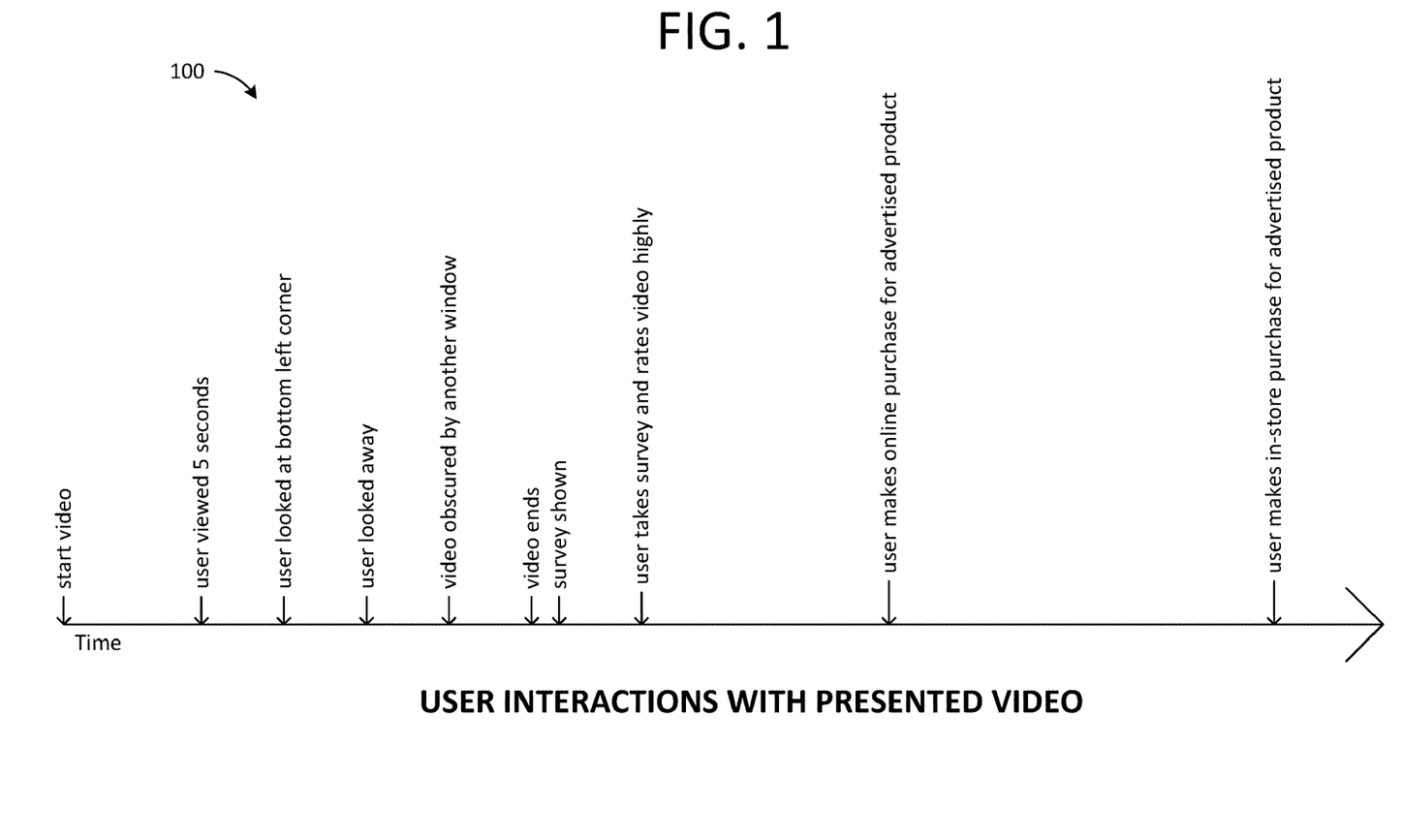
FIG. 1 illustrates a timeline of user interactions with a video segment being presented to a user.

FIG. 1 illustrates a timeline 100 of user interactions with a video segment being presented to a user. FIG. 1 contemplates that the video is being viewed by the user using a user computing device, such as a desktop computer, tablet or mobile phone, which is capable of receiving user input and/or of monitoring the user's actions, such as using a video camera.

At a first point in time, the video segment advertising a product is started, which might occur, for example in response to the loading of a web page selected by the user. A system (which can include the user computing device and/or a cloud-computing based system) determines that the user next viewed the video for 5 seconds, looked at the bottom left corner of the video or the page, and then looked away. These determinations can be made by analysis of a desktop computer webcam input or by front facing video camera input from a mobile phone or tablet. The system then determines that the video became obscured by another window on a user interface of the user computing device. Next, the video ends and a survey is shown to the user, in response to which the user takes the survey and rates the video highly. Next, possibly at some substantially later time and possibly in an unrelated web browsing session, the user makes an online purchase for the advertised product. Next, the system determines that the user makes an in-store purchase of the advertised product, such as by associating a loyalty program used by the user with the user's online identity (other known techniques could be used).

In different configurations, different types of user computing devices might be configured to gather different types of input. For example, the user's device could be a smart television that is only able to determine whether videos or display advertisements were displayed in part or in their entirety. The smart television could, however, be outfitted with a viewer facing video camera to determine, numbers of viewers, viewer glances and/or facial expressions. A tablet, mobile phone or personal computer could be configured to gather voice, video, and various types of click, touch and keyboard input.

Figure 2:
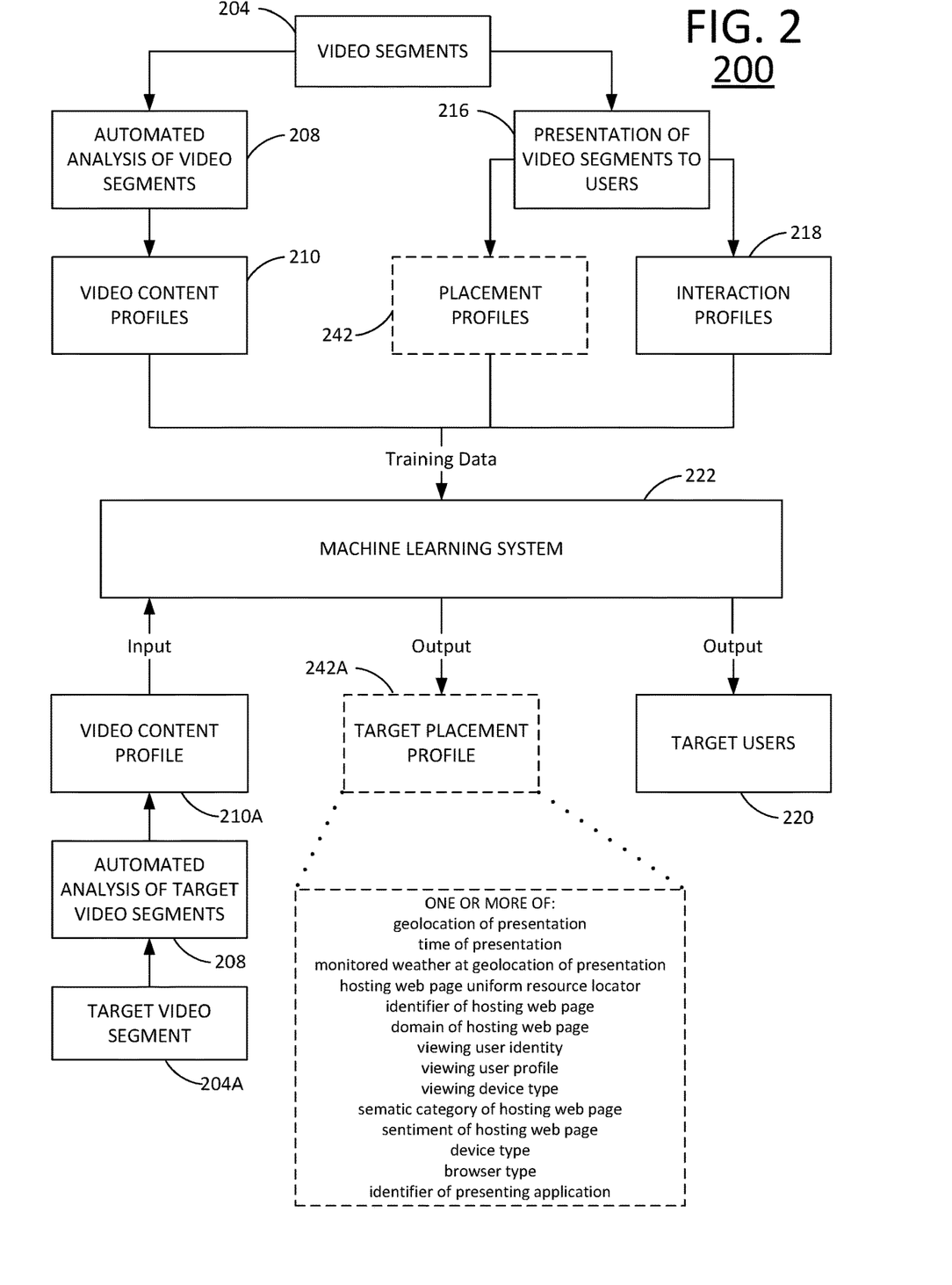
FIG. 2 illustrates a functional diagram of a system for machine-learning-based video segment placement in accordance with one embodiment.
Figure 3:
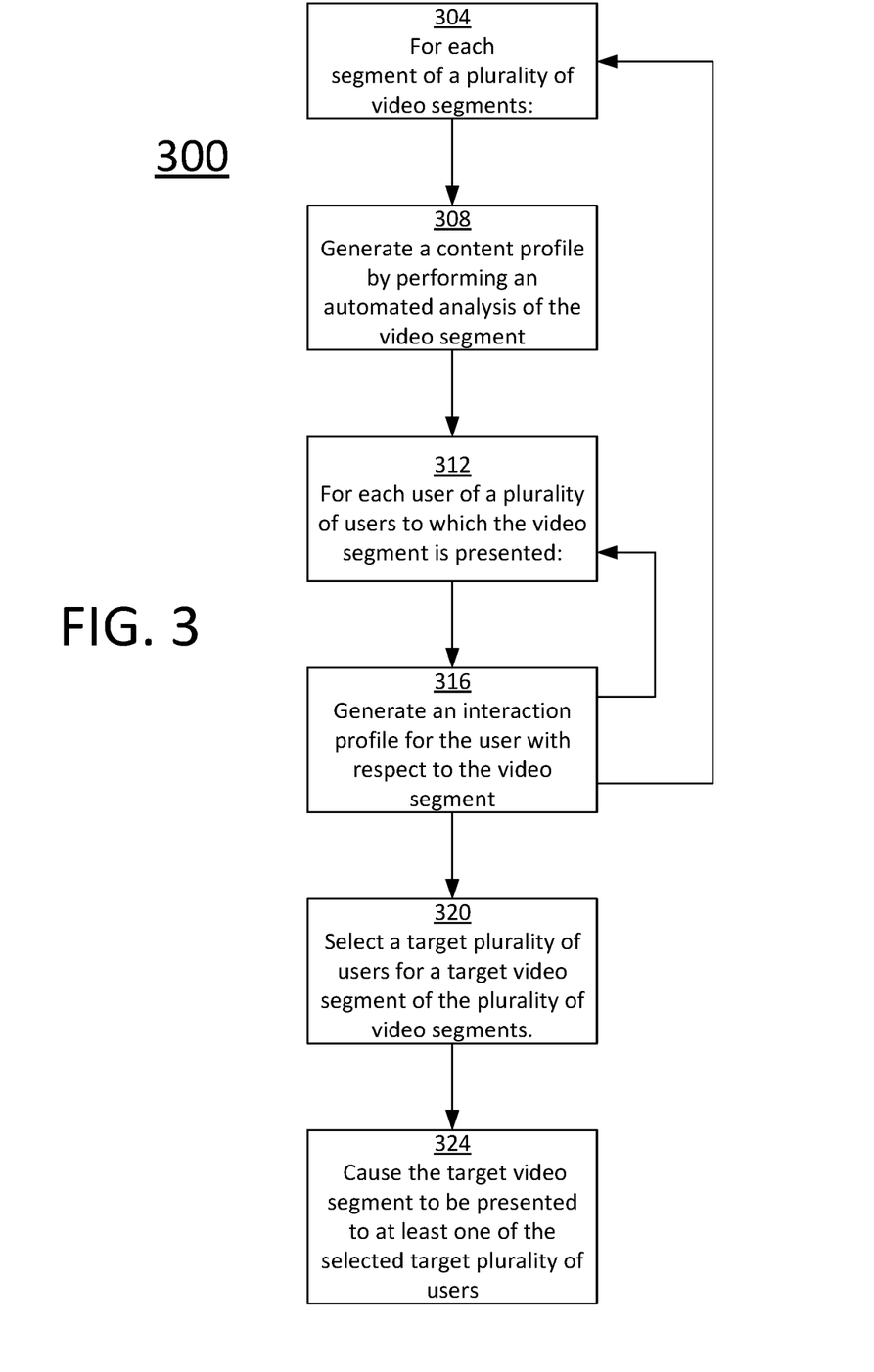
FIG. 3 illustrates a method performed by the system in one embodiment for targeting individual video segments to individual users based on a content profile and user interaction profiles.
Figure 4:
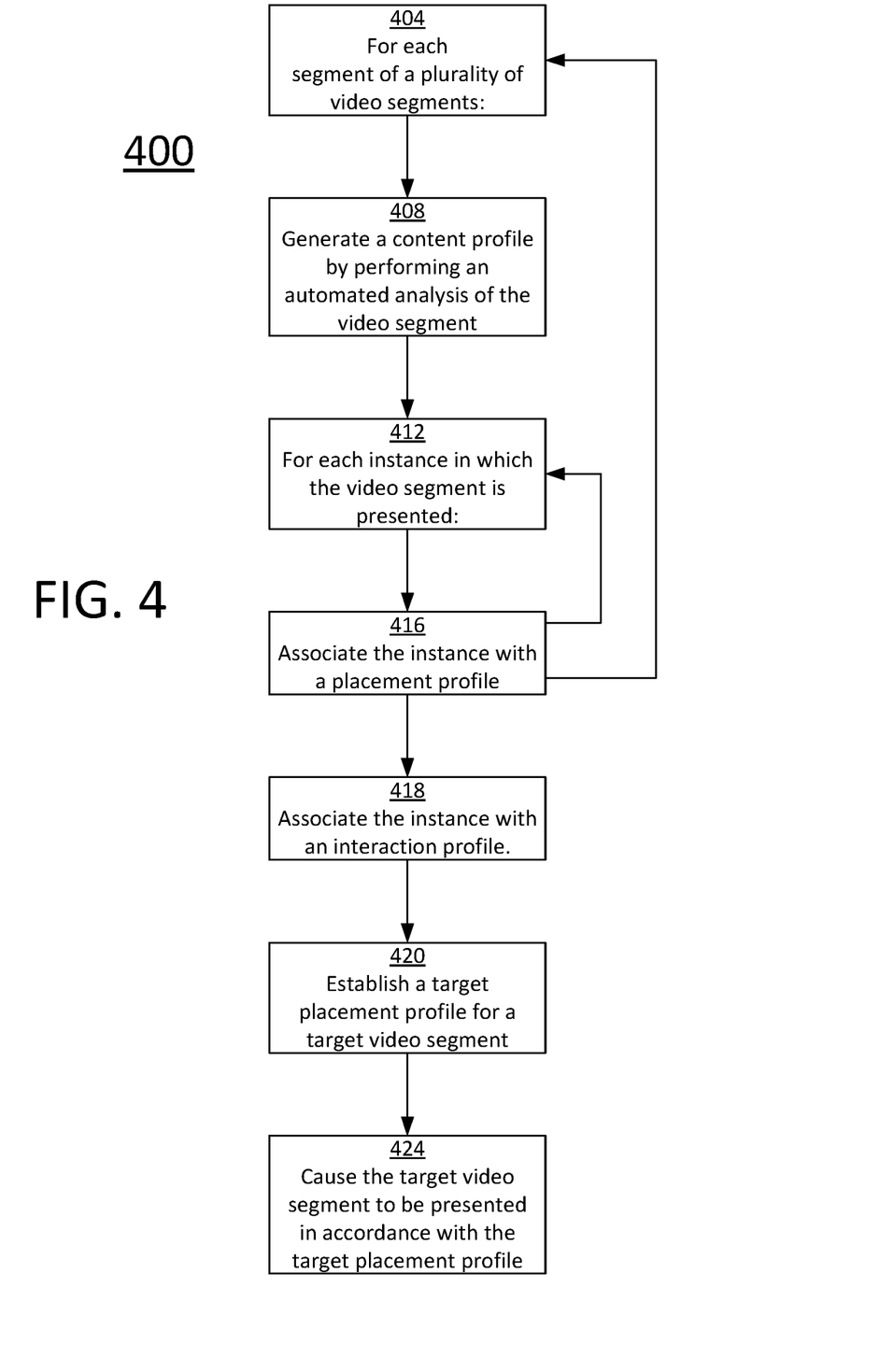
FIG. 4 illustrates a method performed by the system in one embodiment for establishing a target placement profile for a target video segment based on a content profile and user interaction profiles.

FIG. 2 illustrates a functional diagram of a system 200 for machine-learning-based video segment placement in accordance with one embodiment. FIG. 3 illustrates a method 300 performed by the system 200 in one embodiment for targeting individual video segments to individual users based on a content profile and user interaction profiles. FIG. 4 illustrates a method 400 performed by the system 200 in one embodiment for establishing a target placement profile for a target video segment based on a content profile and user interaction profiles. The methods 300 and 400 will now be discussed with reference to the functional diagram of FIG. 2.

Although FIGS. 2-4 are discussed below with reference to video segments, it should be understood that the Figures and the associated methods can be used with respect to any type or combination of types of media content items, which can include, for example, video segments, display advertisements, images, audio segments, and documents, such as web pages. Other types of media, such as virtual reality experiences, can also be included and the methods disclosed herein are not necessarily limited to any particular type of media content.

FIG. 3 illustrates a method 300 for targeting individual video segments to individual users based on a content profile and previously collected user interaction profiles. At a first step 304, the system 200 iterates over each video segment of a plurality of video segments 204 (FIG. 2). The plurality of video segments may be related, such as all being part of a coordinated advertising campaign, or the video segments might not necessarily be related, such as being completely unrelated video segments or advertisements. In the case of advertisements, the objective of the system might be to produce a purchase action by a user or to educate users about a brand. The video segments might not be advertisements, and may, for example, be video segments of a free or paid video service where an objective of the system might be to create an enjoyable viewing experience for the user.

The term "iterate" is used herein for the purpose of convenience, and it should be understood to include performing certain steps for each item in a collection. The term iterate should not be understood to imply or require a specific iterative looping construct or order. Unless indicated otherwise, the system may perform the associated steps within the iteration and for each item in any manner or order, such as using a specific loop, in parallel, or asynchronously and potentially at the control of another process, processes, or individuals, such as users.

At a step 308, for each video segment, the system can generate a content profile 210 for the video segment by performing an automated analysis 208 of the video segment. The content profile can include a plurality of attribute fields where each attribute field specifies a characteristic of the video segment determined based on the automated analysis. The attribute fields can include fields to store, for example: identifications of objects depicted in the video segment and identified by the automated analysis, identifications of music contained in audio of the video segment and identified by the automated analysis, identifications of spoken words contained in audio of the video segment and identified by the automated analysis, identifications of motion depicted in the video segment and identified by the automated analysis, or a category (e.g. selected from a taxonomy of products and/or services) assigned to the video segment by the automated analysis. In one embodiment, the video segment can include metadata relating to the video segment and the automated analysis of the video segment can include analyzing the metadata.

At a step 312, for each video segment, the system iterates over each user of a plurality of users to which the video segment is presented. The system itself may present the video segment or it may cause the video segment to be presented to each user, such as through an advertising network. Each different video segment of the step 304 may be shown to a different plurality of users or the same plurality of users.

At a step 316, for each user, the system can generate an interaction profile 218 for the user with respect to the video segment based on user input to a computer in association with a presentation 216 of the video segment to the user. The presentation of the video segment to the user can performed by a separate device from the system 200, such as any combination of a content delivery network, advertising network, or other distribution network in conjunction with a user-operated device, such as a personal computer, tablet, mobile phone, smart television, or set-top box.

The user input can include active user input such as, for example: keyboard input, pointer selection, button press, voice capture, and touch screen selection. The user input can include passive user input such as, for example: visibility of the presentation of the video segment on a computer display, absence of user input interrupting the presentation of the video segment, an indication that the presentation of the video segment continued to completion, and use of a camera to determine whether the user is viewing the presentation of the video segment. The visibility of the video segment on a computer display can be determined based on whether another application window or scrolling of a page partly or fully obscures display of the video segment.

In one embodiment, the interaction profile can include one or more interaction fields, which can indicate, for example: whether the video segment was presented to the user in its entirety, how much of the video segment was presented to the user, or a time location within the video segment at which the user selected a selectable link presented in or with the video segment. The interaction profile can include an indication of intent by the user to take an action, which, for example, can be obtained in response to a survey presented to the user in association with the presentation of the video segment to the user.

In one embodiment, the system can also generate an interaction score based on the interaction profile and/or calculate an interaction score to be included in the interaction profile. The interaction score can be, for example, a score representing a level of engagement or interaction by the user with the presentation. In one embodiment, the content profile for the video segment can include an inflection point specifying a time location within the video segment at which an event identified by the automated analysis occurs, and the interaction profile can include an input time location within the video segment at which the user provided input. The interaction score can be further based on a comparison between the inflection point and the input time.

At a step 320, which can occur after the iterations of step 304, the system can select a target plurality of users 220 for a target video segment 204A of the plurality of video segments 204. For example, the system can be in the process of implementing an advertising campaign and it may need to display a certain target video advertising segment a certain number of additional times to a certain number of target users. The system can select the plurality of target users based on: the content profile 210A for the target video segment as well as data for one or more subject video segments selected from the plurality of video segments. The data from the subject video segments can include, for example, the content profile for the subject video segment and the plurality of interaction profiles for users with respect to the subject video segment. The interaction profiles can include or be an interaction score.

In the step 320, it may be the case that the system leverages data from only a subset of the plurality of video segments, or it may make the selection based on data for all of the plurality of video segments. For example, the system can input the content profiles of the step 308 and the interaction profiles of the step 316 as training data into a machine learning system 222, such as a neural network or a Bayesian network, along with indications of the desired outcomes in terms of favorable interaction profiles. The trained machine learning system can then make determinations of which target users might be likely to produce the favorable or desired interaction profiles. In one embodiment, the target video segment may have already been presented to some users, in which case feedback from those presentations can be leveraged in selecting the target plurality of users.

In one embodiment, a user profile can be generated for each user of a plurality of users, and the selecting a target plurality of users can be further based on the user profiles. The user profile can include, for example, one or more of: location of the user (e.g. residence location, residence country), geolocation of the user (e.g. specific current geographic location), age of the user, gender of the user, and personality of the user. The user profile can include preferences inferred based on prior actions of the user, such as prior purchases, browsing history, prior interaction profiles, and advertising profiles.

In one embodiment, the selecting a target plurality of users can include determining an engagement likelihood score. The engagement likelihood score can be based on the content profile for the target video segment. The engagement likelihood score can also or alternatively be based on, for each of the at least one subject video segment selected from the plurality of video segments, the content profile for the subject video segment and the plurality of interaction profiles for users with respect to the subject video segment. The target plurality of users can be selected based on the engagement likelihood score.

At a step 324, the system causes the target video segment to be presented to at least one of the selected target plurality of users. For example, once the target plurality of users is selected, the system can configure the target segment to be displayed to one or more of the target plurality of users through an advertising network that tracks and targets individual users. On the other hand, the system can be configured to directly control the display of the target video to users, for example, in the case where the system supports a subscription or non-subscription video viewing service for the users. In this case, the system itself can be configured to directly display the target video to the target users as the users request a next video to watch or when there is an opportunity to automatically show a video to a user.

FIG. 4 illustrates a method 400 for establishing a target placement profile for a target video segment based on a content profile and user interaction profiles. The methods 400 can be performed by a single system together or separately and accordingly any description, features or functionality described above with respect to the method 300, but not repeated below, should be understood to also apply to the method 400 as applicable.

At a first step 404 the system 200 iterates over each video segment of a plurality of video segments 204 (FIG. 2). The plurality of video segments may be related, such as all being part of a coordinated advertising campaign, or the video segments might not necessarily be related, such as being completely unrelated video segments or advertisements. In the case of advertisements, the objective of the system might be to produce a purchase action by a user or to educate users about a brand. The video segments might not be advertisements, and may, for example, be video segments of a free or paid video service where an objective of the system might be to create an enjoyable viewing experience for the user.

The term "iterate" is used herein for the purpose of convenience, and it should be understood to include performing certain steps for each item in a collection. The term iterate should not be understood to imply or require a specific iterative looping construct or order. Unless indicated otherwise, the system may perform the associated steps within the iteration and for each item in any manner or order, such as using a specific loop, in parallel, or asynchronously and potentially at the control of another process, processes, or individuals, such as users.

At a step 408, similar to the step 308, for each video segment, the system can generate a content profile 210 for the video segment by performing an automated analysis 208 of the video segment. The content profile can include a plurality of attribute fields where each attribute fields specifies a characteristic of the video segment determined based on the automated analysis. The attribute fields can include fields to store, for example: identifications of objects depicted in the video segment and identified by the automated analysis, identifications of music contained in audio of the video segment and identified by the automated analysis, identifications of spoken words contained in audio of the video segment and identified by the automated analysis, identifications of motion depicted in the video segment and identified by the automated analysis, or a category (e.g. selected from a taxonomy of products and/or services) assigned to the video segment by the automated analysis. In one embodiment, the video segment can include metadata relating to the video segment and the automated analysis of the video segment can include analyzing the metadata.

At a step 412, for each video segment, the system iterates over each instance in which the segment is presented to a user. The system itself may present the video segment or it may cause the video segment to be presented to each user, such as through an advertising network. Each different video segment of the step 404 may be shown to a different plurality of users or the same plurality of users.

At a step 416, for each instance in which the video segment is presented, the system associates the instance with a placement profile 242 (FIG. 2), descriptive of the placement of the video segment. The placement profile can include any one or more of: geolocation of presentation, time of presentation, monitored weather at geolocation of presentation, hosting web page uniform resource locator, identifier of hosting web page, domain of hosting web page, viewing user identity, viewing user profile, viewing device type, sematic category of hosting web page, sentiment of hosting web page, device type, browser type, and identifier of presenting application.

A viewing user profile can include, for example, one or more of: location of the user (e.g. residence location, residence country), geolocation of the user (e.g. specific current geographic location), age of the user, gender of the user, and personality of the user. The user profile can include preferences inferred based on prior actions of the user, such as prior purchases, browsing history, prior interaction profiles, and advertising profiles.

At a step 418, for each instance, the system can generate and associate the instance with an interaction profile 218 for the instance with respect to the video segment based on user input to a computer in association with a presentation 216 of the video segment to the user. The presentation of the video segment to the user can performed by a separate device from the system 200, such as any combination of a content delivery network, advertising network, or other distribution network in conjunction with a user-operated device, such as a personal computer, tablet, mobile phone, smart television, or set-top box.

The user input can include active user input such as, for example: keyboard input, pointer selection, button press, voice capture, and touch screen selection. The user input can include passive user input such as, for example: visibility of the presentation of the video segment on a computer display, absence of user input interrupting the presentation of the video segment, an indication that the presentation of the video segment continued to completion, and use of a camera to determine whether the user is viewing the presentation of the video segment. The visibility of the video segment on a computer display can be determined based on whether another application window or scrolling of a page partly or fully obscures display of the video segment.

In one embodiment, the interaction profile can include one or more interaction fields, which can indicate, for example: whether the video segment was presented to the user in its entirety, how much of the video segment was presented to the user, or a time location within the video segment at which the user selected a selectable link presented in or with the video segment. The interaction profile can include an indication of intent by the user to take an action, which, for example, can be obtained in response to a survey presented to the user in association with the presentation of the video segment to the user.

In one embodiment, the system can generate an interaction score based on the interaction profile and/or calculate an interaction score to be included in the interaction profile. The interaction score can be, for example, a score representing a level of engagement or interaction by the user with the presentation. In one embodiment, the content profile for the video segment can include an inflection point specifying a time location within the video segment at which an event identified by the automated analysis occurs, and the interaction profile can include an input time location within the video segment at which the user provided input. The interaction score can be further based on a comparison between the inflection point and the input time.

In one embodiment, a single interaction profile can be associated with a plurality of instances in which the video segment is presented based on aggregated user response data associated with the plurality of instances. The aggregated user response data can be collected based on user actions performed subsequent to the plurality of instances in which the video segment is presented. For example, the aggregated user response data can be based on product purchase data collected in association with one or more of: a geographic area; a temporal duration; and viewing user geolocation tracking, correlated with the plurality of instances in which the video segment is presented. The product purchase data can be indicative of one or more of: online product purchases and in-person product purchases.

At a step 420, which can occur after the iterations of step 404, the system can establish a target placement profile 242A (FIG. 2) for a target video segment 204A of the plurality of video segments 204. For example, the system can be in the process of implementing an advertising campaign and it may need to display a certain target video advertising segment a certain number of additional times to a certain number of users. The system can select the target placement profile for presenting the target video segment to users based on the content profile 210A for the target video segment as well as data for the plurality of video segments. The data for the plurality of video segments can include the content profile for each video segment. The data can also include, for each instance in which each video segment has been presented: the associated placement profile and the associated interaction profile. The associated interaction profile can include an interaction score.

The target placement profile can be established by, for example, creating a new profile, selecting a profile from a set of predetermined or preexisting profiles, and/or by combining features or characteristics of previously detected placement profiles. The target placement profile can include any one or more of the features noted above with respect to the placement profile.

The target video may or may not be one of the plurality of segments. Accordingly, the target video segment may have already been presented to some users using some prior placements, in which case feedback from those presentations can be leveraged in selecting the target plurality of users. In this case, the establishing a target placement profile can be further based on, for each instance of a plurality of instances in which the target video segment is presented: the associated placement profile, and the associated interaction profile.

In the step 420, it may be the case that the system leverages data from only a subset of the plurality of instances in which video segments are presented to users, or it may make the selection based on data for all of the instances. For example, the system can input the content profiles of the step 408, the placement profiles of the step 416, and the interaction profiles of the step 418 as training data into the machine learning system 222, such as a neural network or a Bayesian network, along with indications of the desired outcomes in terms of favorable interaction profiles. The trained machine learning system can then make determinations of which target placement profiles might be likely to produce the favorable or desired interaction profiles. In one embodiment, the target placement profile may have already been used in practice, in which case feedback from the associated presentations can be leveraged in selecting the target placement profile.

At a step 424, the system causes the target video segment to be presented in accordance with the established or selected target placement profile. For example, once the target profile is established, the system can configure the target segment to be displayed to users in one or more placements matching the target placement through an advertising network offering targeted advertisement placements.

Figure 5:
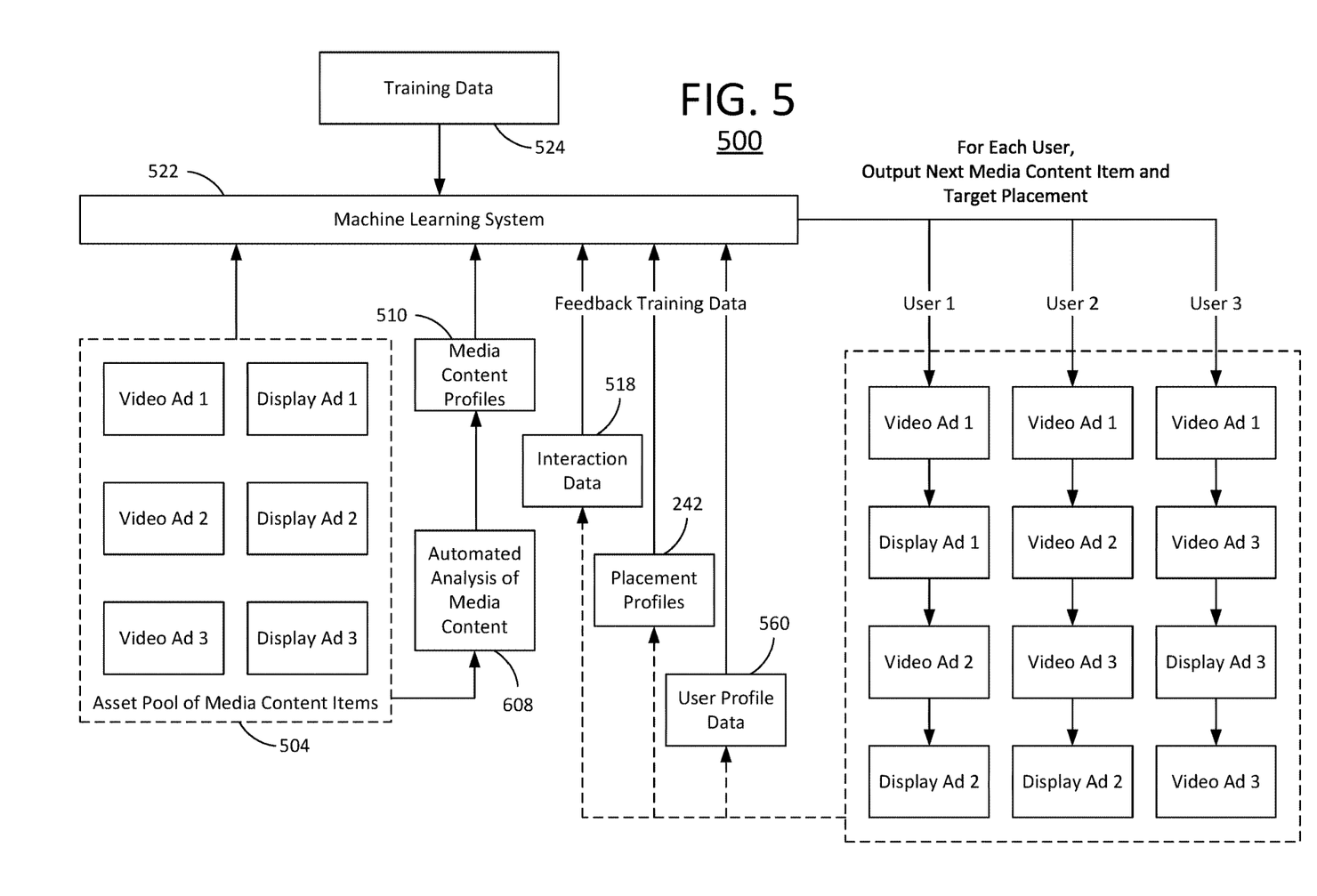
FIG. 5 illustrates a functional block diagram of a system for machine-learning-based media content item sequencing and placement in accordance with one embodiment.
Figure 6:
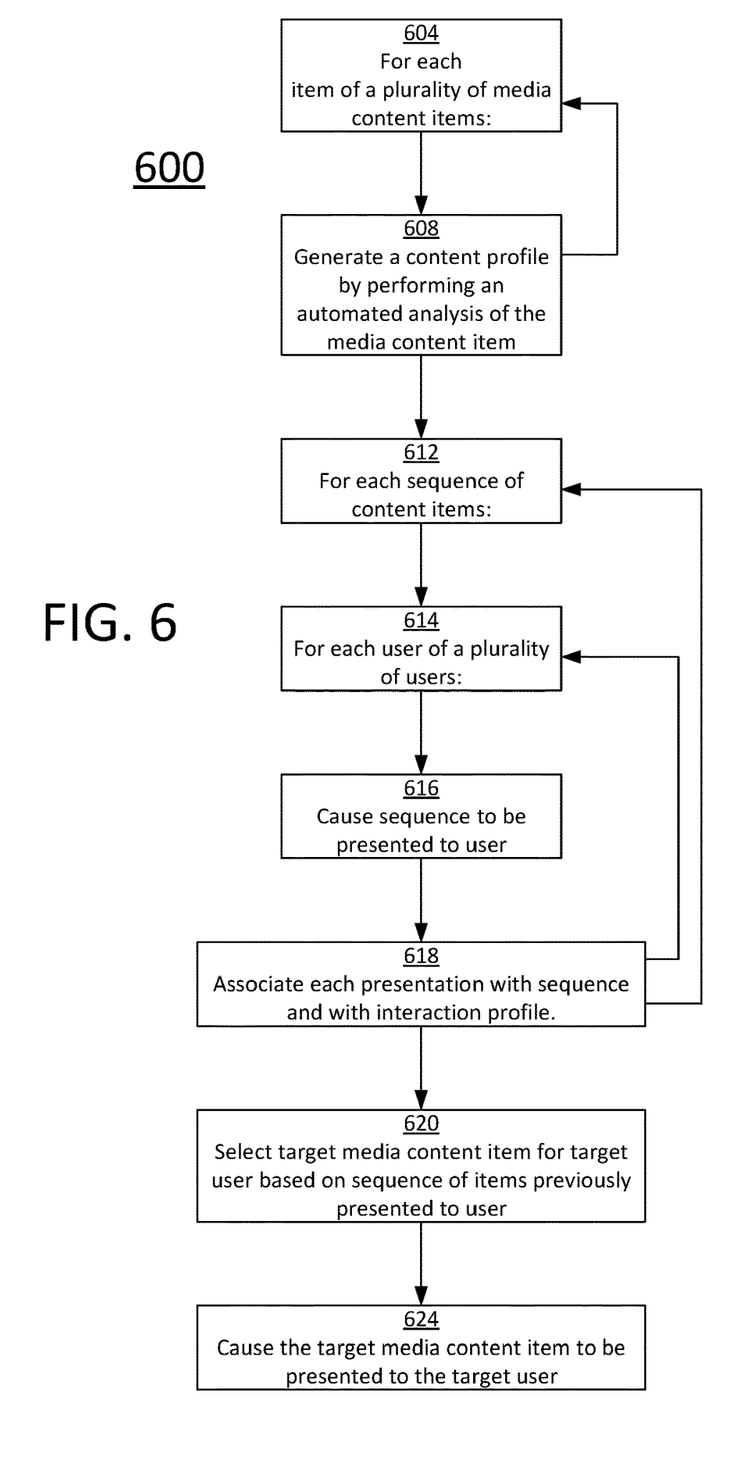
FIG. 6 illustrates a method for sequencing and placing media content items for presentation to target users.
Figure 7:
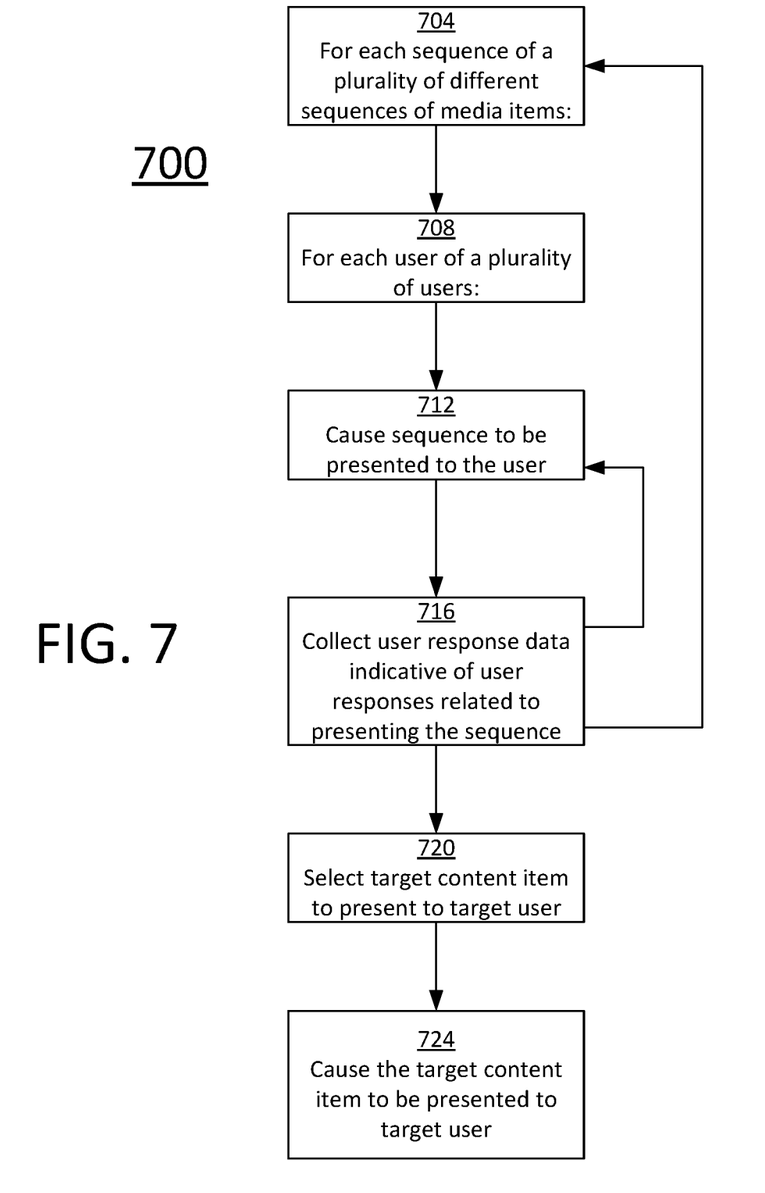
FIG. 7 illustrates a method for selecting a media content items for presentation to a target user.

FIG. 5 illustrates a functional block diagram of a system 500 for machine-learning-based media content item sequencing and placement in accordance with one embodiment. FIG. 6 illustrates a first method 600 and FIG. 7 illustrates a second method for sequencing and placing media content items for presentation to target users. The methods 600 and 700 will now be discussed with reference to the functional blocks of FIG. 5. The system 500 can be integrated with the system 200 and the methods 600 and 700 can be performed by the system 500 and/or 200 in conjunction with and/or integrated with the methods 300 and/or 400. Accordingly, any description, features or functionality described above with respect to the methods 300 and 400, but not repeated below, should be understood to also apply to the methods 600 and 700 as applicable. Similarly, description, features or functionality described below with respect to either of the methods 600 or 700 should be understood to also apply to the others of methods 300, 400, 600 and 700 as applicable. The methods 600 and 700, like the methods 300 and 400 can be used with respect to any type or combination of types of media content items, which can include, for example, video segments, display advertisements, images, audio segments, and documents, such as web pages. Other types of media, such as virtual reality experiences, can also be included and the methods disclosed herein are not necessarily limited to any particular type of media content.

FIG. 6 illustrates a method 600 for sequencing and placing media content items for presentation to target users. At a first step 504, the system 500 iterates over each media content item of a plurality or asset pool of media content items 504 (FIG. 5). The plurality of media content items may be related, such as all being part of a coordinated advertising campaign, or the items might not necessarily be related, such as being completely unrelated video segments or advertisements. In the case of advertisements, the objective of the system might be to produce a purchase action by a user or to educate users about a brand. The media content items might not be advertisements, and may, for example, be web pages.

The term "iterate" is used herein for the purpose of convenience, and it should be understood to include performing certain steps for each item in a collection. The term iterate should not be understood to imply or require a specific iterative looping construct or order. Unless indicated otherwise, the system may perform the associated steps within the iteration and for each item in any manner or order, such as using a specific loop, in parallel, or asynchronously and potentially at the control of another process, processes, or individuals, such as users.

At a step 608, for each media content item, the system can generate a content profile 510 for the media content item by performing an automated analysis 208 of the media content item. The content profile can include a plurality of attribute fields where each attribute field specifies a characteristic of the media content item determined based on the automated analysis. The attribute fields can include fields to store, for example: identifications of objects depicted in the media content item and identified by the automated analysis, identifications of music contained in audio of the media content item and identified by the automated analysis, identifications of spoken words contained in audio of the media content item and identified by the automated analysis, identifications of motion depicted in the media content item and identified by the automated analysis, or a category (e.g. selected from a taxonomy of products and/or services) assigned to the media content item by the automated analysis. In one embodiment, the media content item can include metadata relating to the media content item and the automated analysis of the media content item can include analyzing the metadata.

At a step 612, the system first iterates over different sequences of content items to be presented to users. The different sequences can be initially selected randomly, and eventually after training of the system, the system can focus in on sequences that perform better. Accordingly, the system iterates over each sequence of a plurality of different sequences of media content items selected from the plurality of media content items. At a step 614, for each sequence of content items, the system iterates over each user of a plurality of users. The plurality of users for each iteration for each sequence may be a different plurality of users or the same plurality of users.

At a step 616, for the each user and for each sequence, the system causes an instance of each media content item in the each sequence to be presented to the each user. At a step 618, for the each instance in which a media content item in the each sequence is presented to the each user, the system associates the each instance in which the media content item is presented with: the instance of the each sequence and an interaction profile indicative of user responses related to the presentation of the media content item. The steps 616 and 618 can be performed for various combinations of the iterations over the steps 612 and 614 after which control can pass to a next step 620.

As discussed above with respect to the methods 300 and 400, the interaction profile can include one or more interaction fields, which can indicate, for example: whether the media content item was presented to the user in its entirety, how much of the media content item was presented to the user, or a time location within the media content item at which the user selected a selectable link presented in or with the media content item. The interaction profile can include an indication of intent by the user to take an action, which, for example, can be obtained in response to a survey presented to the user in association with the presentation of the media content item to the user.

At the step 620, a target media content item is selected from the plurality of media content items to present to a target user based on: a sequence of media content items previously presented to the target user, the content profiles for the plurality of media content items, the interaction profiles 518 for the instances in which media content items are presented, and the associations between instances of media content items being presented and instances of sequences in which media content items are presented.

In the step 620, it may be the case that the system leverages data from only a subset of the plurality of sequences and/or media content items, or it may make the selection based on all available data. For example, the system 500 can input the content profiles of the step 608, and the associations and the interaction profiles of the step 618 as training data into a machine learning system 522, such as a neural network or a Bayesian network, along with indications of the desired outcomes in terms of favorable interaction profiles (e.g. training data 524 in FIG. 5). The trained machine learning system can then make determinations of which target users might be likely to produce the favorable or desired interaction profiles. In one embodiment, the sequence of media content items previously presented to the target user may have already been presented to other users, in which case feedback from those presentations can be leveraged in selecting the target media content item.

At a step 624, the system causes the target media content item to be presented to the target user. For example, once the target media content item is selected, the system can configure the target media content item to be displayed to the target user through an advertising network that tracks and targets individual users. For example, the media content item can be presented to the user through an advertising placement such as a targeted web advertising placement or a targeted mobile app advertising placement.

On the other hand, the system can be configured to directly control the display of the target item to the user, for example, in the case where the system supports a subscription or non-subscription content delivery service or website for the user. In this case, the system itself can be configured to directly display the target item to the target user as the user requests a next item.

In one embodiment, for the each instance in which a media content item in the each sequence is presented to the each user, the each instance can be further associated with a placement profile descriptive of a context in which the media content item is presented. In this case, a target placement profile can be established for the target media content item based on: the placement profiles for the instances in which media content items are presented, and the interaction profiles for the instances in which media content items are presented. The target media content item can then be presented to the target user in accordance with the target placement profile. The establishing a target placement profile for the target media content item can be further based on the content profiles for the plurality of media content items. The establishing a target placement profile for the target media content item can be further based on the sequence of media content items previously presented to the target user. The placement profile can include, for example, any one or more of: geolocation of presentation, time of presentation, monitored weather at geolocation of presentation, hosting web page uniform resource locator, identifier of hosting web page, domain of hosting web page, viewing user identity, viewing user profile 560, viewing device type, sematic category of hosting web page, sentiment of hosting web page, device type, browser type, and identifier of presenting application.

FIG. 7 illustrates a method 700 for selecting a media content items for presentation to a target user. At a first step 704, the system 500 iterates over each sequence of a plurality of different sequences of media content items, wherein the media content items are selected from a plurality of media content items in order to collect media content item sequence response data. The plurality of media content items may be related, such as all being part of a coordinated advertising campaign, or the items might not necessarily be related, such as being completely unrelated video segments or advertisements. In the case of advertisements, the objective of the system might be to produce a purchase action by a user or to educate users about a brand. The media content items might not be advertisements, and may, for example, be web pages.

The term "iterate" is used herein for the purpose of convenience, and it should be understood to include performing certain steps for each item in a collection. The term iterate should not be understood to imply or require a specific iterative looping construct or order. Unless indicated otherwise, the system may perform the associated steps within the iteration and for each item in any manner or order, such as using a specific loop, in parallel, or asynchronously and potentially at the control of another process, processes, or individuals, such as users.

At a step 708, for each sequence in turn, the system iterates over each user of a plurality of users. At a step 712, each sequence is presented to the plurality of users. The system itself may present the video sequence or it may cause the sequence to be presented to each user, such as through an advertising network. Each different sequence may be shown to a different plurality of users or the same plurality of users. At a step 716, the system receives and/or collects user response data indicative of user responses related to the presenting the each sequence.

At a step 720, a target media content item is selected from the plurality of media content items to present to a target user based on: a sequence of media content items previously presented to the target user and the collected media content item sequence response data. At a step 724, the system causes the target media content item to be presented to the target user.

The sequence of media content items previously presented to the target user can include a portion of one of the plurality of different sequences of media content items. The portion can be an initial portion of the one of the plurality of different sequences of media content items including at least a first media content item from the one of the plurality of different sequences.

The selecting a target media content item can be performed using a trained machine learning system. The trained machine learning system can be trained using the collected media content item sequence response data. The trained machine learning system can be a neural network. The trained machine learning system can be a Bayesian network. The media content item sequences can include video segments and non-video display advertisements. The media content item sequences can include user consumable content including, for example, video segments, display advertisements, images, audio segments, and documents.

The method 700 can further include: for each media content item of the plurality of media content items: generating a content profile for the media content item by performing an automated analysis of the media content item, wherein the content profile for the media content item comprises a plurality of attribute fields, each of which attribute fields specifies a characteristic of the media content item determined based on the automated analysis of the media content item, and for each instance of a plurality of instances in which the media content item is presented, associating the each instance with: a placement profile descriptive of a context in which the media content item is presented, and an interaction profile indicative of user responses related to the presentation of the media content item; and for the target media content item, establishing a target placement profile for the target media content item based on: a content profile for the target media content item generated by performing an automated analysis of the target media content item, wherein the content profile for the target media content item comprises a plurality of attribute fields each of which attribute fields specifies a characteristic of the target media content item determined based on the automated analysis of the target media content item, the content profiles for the plurality of media content items, the interaction profiles for the instances in which media content items are presented, and the placement profiles for the instances in which media content items are presented, wherein the target media content item is presented to the target user in accordance with the target placement profile.

The target media content item can be selected from the plurality of media content items, and the establishing a placement profile for the target media content item can be further based on, for each instance of a plurality of instances in which the target media content item is presented: the associated placement profile, and the associated interaction profile.

A placement profile can include any combination of one or more items such as: geolocation of presentation, time of presentation, monitored weather at geolocation of presentation, hosting web page uniform resource locator, identifier of hosting web page, domain of hosting web page, viewing user identity, viewing user profile, viewing device type, sematic category of hosting web page, sentiment of hosting web page, device type, browser type, and identifier of presenting application. Establishing a target placement profile can include creating a placement profile. Establishing a target placement profile can include selecting a placement profile from a plurality of preexisting placement profiles. A placement profile can include a viewing user identity. A placement profile can include a viewing user profile. The viewing user profile can include for example, one or more of: user geolocation, user age, user gender, and user personality. The viewing user profile can include an advertising profile including preferences inferred based on prior actions by the viewing user. A placement profile can be a viewing user profile. A placement profile can be a viewing user identity.

Each interaction profile can include an interaction score indicative of engagement of a viewing user with the media content item. The target placement profile can be established based on the interaction scores. The media content item can include a video segment, and the content profile for the media content item can include an inflection point specifying a time location within the video segment at which an event identified by the automated analysis occurs, and the interaction profile can include an input time location within the video segment at which the user provided input. The interaction score can be further based on a comparison between the inflection point and the input time.

A single interaction profile can be associated with multiple instances in which the media content item is presented, and the single interaction profile can be based on aggregated user response data associated with the multiple instances. The aggregated user response data can be collected based on user actions performed subsequent to the multiple instances in which the media content item is presented. The aggregated user response data can be based on product purchase data collected in association with one or more of a geographic area, a temporal duration, and viewing user geolocation tracking correlated with the multiple instances in which the media content item is presented. The product purchase data can be indicative of one or more of online product purchases and in-person product purchases.

The user response data can be based on active user input such as, for example: keyboard input, pointer selection, button press, voice capture, and/or touch screen selection.

The media content item can include a video segment, and the user response data can be based on passive user input such as, for example: visibility of the presentation of the video segment on a computer display, absence of user input interrupting the presentation of the video segment, an indication that the presentation of the video segment continued to completion, and/or use of a camera to determine whether the user is viewing the presentation of the video segment. Visibility of the video segment on a computer display can be determined based on whether another application window or scrolling of a page partly or fully obscures display of the video segment.

The media content item can include metadata relating to the media content item and the automated analysis of the media content item can include analyzing the metadata. The presentation of the media content item can be performed by a separate device from the computer system.

The media content item can include a video segment, and the interaction profile can include at least one interaction field. One of the at least one interaction fields can indicate whether the video segment was presented in its entirety. One of the at least one interaction fields can indicate how much of the video segment was presented. One of the at least one interaction fields can indicate a time location within the video segment at which time location a user selected a selectable link presented in association the video segment. One of the at least one attribute fields can be configured to store identifications of objects identified in the media content item by the automated analysis. One of the at least one attribute fields can be configured to store identifications of music identified in the media content item by the automated analysis. One of the at least one attribute fields can be configured to store identifications of spoken words identified in the media content item by the automated analysis. One of the at least one attribute fields can be configured to store identifications of motion identified in the media content item by the automated analysis. One of the at least one attribute fields can be configured to store a category assigned to the media content item by the automated analysis. The category can be selected from a taxonomy of products and services.

The target media content item can be, but need not be, one of the plurality of media content items.

The interaction profile can include an indication of intent by a user to take an action. The indication of intent by the user to take an action can be obtained in response to a survey presented to the user in association with the presentation of the media content item to the user.

The establishing a target placement profile can be performed using a trained machine learning system. The trained machine learning system can be trained using the content profiles, the placement profiles, and the interaction profiles, for the plurality of media content items. The trained machine learning system can be a neural network. The trained machine learning system can be a Bayesian network. The selecting a target media content item can be performed using a trained machine learning system. The trained machine learning system can be trained using the collected media content item sequence response data. The trained machine learning system can be a neural network. The trained machine learning system is a Bayesian network.

For each user of the plurality of users, the received user response data indicative of user responses related to the presenting the each sequence can be based on, for at least one media content item in the sequence, at least one user response related to an instance in which the media content item is presented to the each user.

The causing the each sequence to be presented to a plurality of users can include, for each user of the plurality of users, causing each media content item in the sequence to be presented to the each user through an advertising placement.

The advertising placement can be a targeted web advertising placement. The advertising placement can be a targeted mobile app advertising placement. The plurality of media content items can all share a common relationship.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 8:
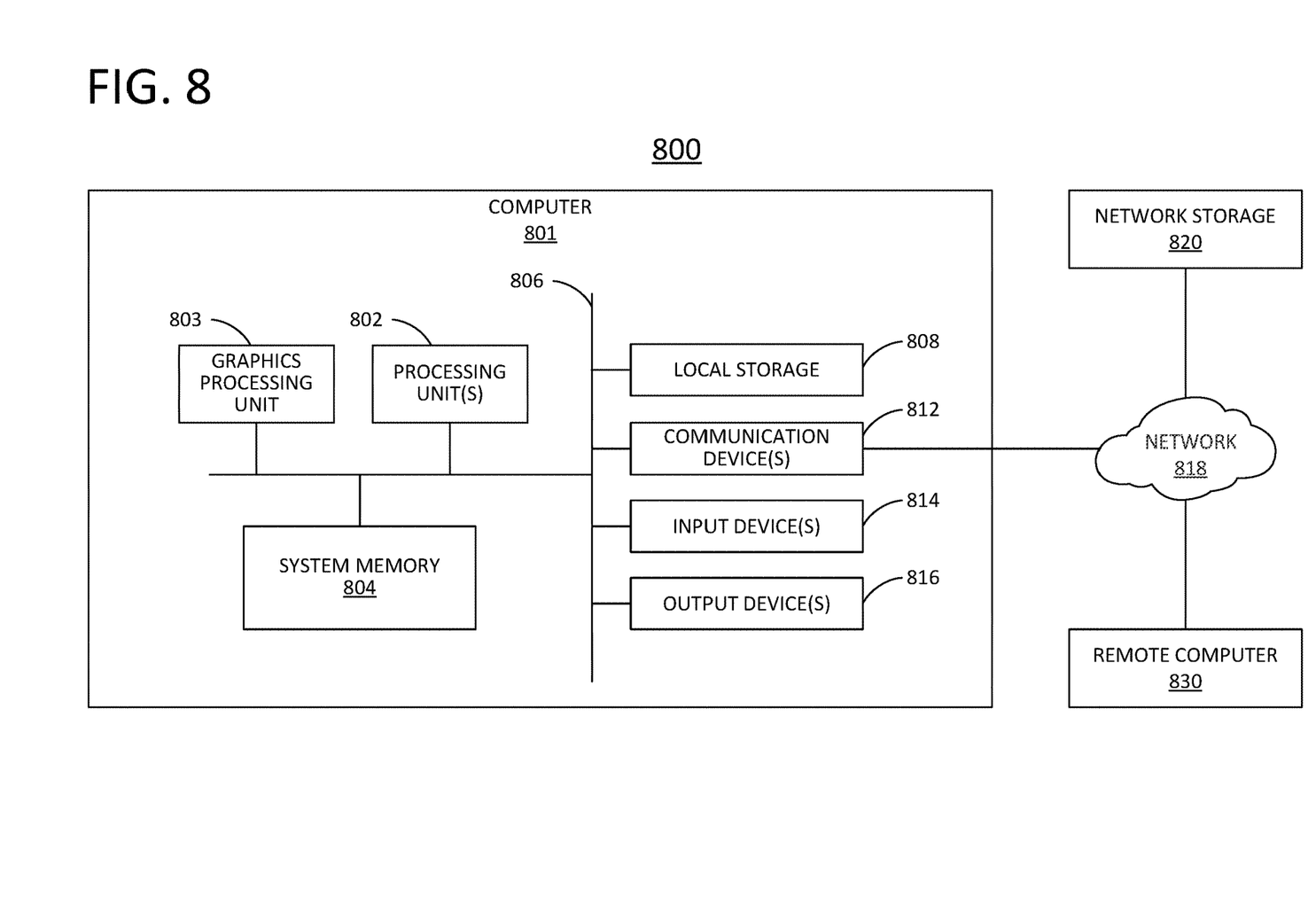
FIG. 8 illustrates a general computer architecture that can be appropriately configured to implement components disclosed in accordance with various embodiments.

FIG. 8 illustrates a general computer architecture 800 that can be appropriately configured to implement components disclosed in accordance with various embodiments. The computing architecture 800 can include various common computing elements, such as a computer 801, a network 818, and one or more remote computers 830. The embodiments disclosed herein, however, are not limited to implementation by the general computing architecture 800.

Referring to FIG. 8, the computer 801 can be any of a variety of general purpose computers such as, for example, a server, a desktop computer, a laptop computer, a tablet computer or a mobile computing device. The computer 801 can include a processing unit 802, a system memory 804 and a system bus 806.

The processing unit 802 can be any of various commercially available computer processors that can include one or more processing cores, which can operate independently of each other. Additional co-processing units, such as a graphics processing unit 803, also can be present in the computer.

The system memory 804 can include volatile devices, such as dynamic random access memory (DRAM) or other random access memory devices. The system memory 804 can also or alternatively include non-volatile devices, such as a read-only memory or flash memory.

The computer 801 can include local non-volatile secondary storage 808 such as a disk drive, solid state disk, or removable memory card. The local storage 808 can include one or more removable and/or non-removable storage units. The local storage 808 can be used to store an operating system that initiates and manages various applications that execute on the computer. The local storage 808 can also be used to store special purpose software configured to implement the components of the embodiments disclosed herein and that can be executed as one or more applications under the operating system.

The computer 801 can also include communication device(s) 812 through which the computer communicates with other devices, such as one or more remote computers 830, over wired and/or wireless computer networks 818. Communications device(s) 812 can include, for example, a network interface for communicating data over a wired computer network. The communication device(s) 812 can include, for example, one or more radio transmitters for communications over Wi-Fi, Bluetooth, and/or mobile telephone networks.

The computer 801 can also access network storage 820 through the computer network 818. The network storage can include, for example, a network attached storage device located on a local network, or cloud-based storage hosted at one or more remote data centers. The operating system and/or special purpose software can alternatively be stored in the network storage 820.

The computer 801 can have various input device(s) 814 such as a keyboard, mouse, touchscreen, camera, microphone, accelerometer, thermometer, magnetometer, or any other sensor. Output device(s) 816 such as a display, speakers, printer, eccentric rotating mass vibration motor can also be included.

The various storage 808, communication device(s) 812, output devices 816 and input devices 814 can be integrated within a housing of the computer, or can be connected through various input/output interface devices on the computer, in which case the reference numbers 808, 812, 814 and 816 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors.

The invention claimed is:

1. A method performed by a computer system having at least one processor and a memory, the method comprising, the computer system:
   for each media content item of a plurality of media content items, generating a content profile for the media content item by performing an automated analysis of the media content item, wherein the content profile comprises a plurality of attribute fields each of which attribute fields specifies a characteristic of the media content item determined based on the automated analysis;
   for each sequence of a plurality of different ordered sequences of media content items selected from the plurality of media content items, and with respect to the each sequence, for each user of a plurality of individual users:
      presenting an instance of the each sequence by, for each media content item in the each sequence, causing an instance of the each media content item to be presented to the each user in order as targeted web advertising placements within the each user's web browsing path at unrelated locations on the World Wide Web, and
      for each instance in which a media content item in the each sequence is presented to the each user, associating the each instance in which the media content item is presented with:
         the instance of the each sequence in which the media content item is presented, and
         an interaction profile indicative of user responses related to the presentation of the media content item;
   selecting a target media content item from the plurality of media content items to present to a target user based on:
      a sequence specifying an ordering of media content items previously presented to the target user,
      the content profiles for the plurality of media content items,
      the interaction profiles for the instances in which media content items are presented, and
      the associations between instances of media content items being presented and instances of sequences in which media content items are presented; and
   causing the target media content item to be presented to the target user,
   wherein one of the media content items comprises a video segment,
   wherein the content profile for the one media content item comprises an inflection point specifying a time location within the video segment at which an event identified by the automated analysis occurs,
   wherein the interaction profile for an instance in which the one media content item is presented comprises an input time location within the video segment at which the each user provided input,
   wherein the interaction profile comprises an interaction score indicative of engagement of a viewing user with the media content item, and
   wherein the interaction score for the instance in which the one media content item is presented is based on a comparison between the inflection point and the input time.

2. The method of claim 1,
   wherein for the each instance in which a media content item in the each sequence is presented to the each user, further associating the each instance with:
      a placement profile descriptive of a context in which the media content item is presented,
   the method further comprising:
   establishing a target placement profile for the target media content item based on:
      the placement profiles for the instances in which media content items are presented, and
      the interaction profiles for the instances in which media content items are presented,
   wherein the target media content item is presented to the target user in accordance with the target placement profile.

3. The method of claim 1, wherein the plurality of users consists of individual users tracked and targeted for web advertising placements by an advertising network, and wherein the placement profile includes a domain of a hosting web page in the context of which the media content item is presented.

4. The method of claim 1, wherein a single interaction profile is associated with a plurality of instances in which the media content item is presented, and wherein the single interaction profile is based on aggregated user response data associated with the plurality of instances.

5. The method of claim 4, wherein the aggregated user response data is collected based on user actions performed subsequent to the plurality of instances in which the media content item is presented.

6. The method of claim 5, wherein the aggregated user response data is based on product purchase data collected in association with one or more of a geographic area, a temporal duration, and viewing user geolocation tracking correlated with the plurality of instances in which the media content item is presented.

7. The method of claim 6, wherein the product purchase data is indicative of one or more of online product purchases and in-person product purchases.

8. The method of claim 1, wherein the interaction profile is based on active user input selected from the group consisting of: keyboard input, pointer selection, button press, voice capture, and touch screen selection.

9. The method of claim 1, wherein each of the media content items comprises a video segment, and wherein the interaction profile is based on passive user input selected from the group consisting of: visibility of the presentation of the video segment on a computer display, absence of user input interrupting the presentation of the video segment, an indication that the presentation of the video segment continued to completion, and use of a camera to determine whether the user is viewing the presentation of the video segment.

10. The method of claim 9, wherein the interaction profile is based on visibility of the video segment on a computer display determined based on whether another application window or scrolling of a page partly or fully obscures display of the video segment.

11. The method of claim 10, wherein the interaction profile comprises one or more interaction fields, and wherein one of the at least one interaction fields indicates a time location within the video segment at which time location a user selected a selectable link presented in association the video segment.

12. The method of claim 1, wherein one of the at least one attribute fields is configured to store identifications of spoken words identified in the media content item by the automated analysis.

13. The method of claim 12, wherein one of the at least one attribute fields is configured to store a category assigned to the media content item by the automated analysis, and wherein the category is selected from a taxonomy of products and services.

14. The method of claim 13, wherein one of the at least one attribute fields is configured to store identifications of objects identified in the media content item by the automated analysis.

15. The method of claim 13, wherein one of the at least one attribute fields is configured to store identifications of music identified in the media content item by the automated analysis.

16. The method of claim 13, wherein one of the at least one attribute fields is configured to store identifications of motion identified in the media content item by the automated analysis.

17. The method of claim 1, wherein the interaction profile for at least one instance in which a media content item is presented to the each user comprises an indication of intent by a user to take an action.

18. The method of claim 1, wherein the target media content item is one of the plurality of media content items.

19. The method of claim 1, wherein the target media content item is not one of the plurality of media content items.

20. The method of claim 1, wherein for at least one instance in which a media content item is presented, the presentation of the media content item is performed by a separate device from the computer system.

21. The method of claim 1, wherein the sequences of media content items comprise video segments and non-video display advertisements.

* * * * *